United States Patent
Pilawski

(10) Patent No.: US 9,689,501 B2
(45) Date of Patent: Jun. 27, 2017

(54) SLIDE VALVE HAVING A VALVE SLIDE

(75) Inventor: Andrzej Pilawski, Vaihingen/Enz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 128 days.

(21) Appl. No.: 14/235,954

(22) PCT Filed: Jun. 6, 2012

(86) PCT No.: PCT/EP2012/060679
§ 371 (c)(1),
(2), (4) Date: Jun. 13, 2014

(87) PCT Pub. No.: WO2013/020737
PCT Pub. Date: Feb. 14, 2013

(65) Prior Publication Data
US 2014/0291559 A1     Oct. 2, 2014

(30) Foreign Application Priority Data

Aug. 9, 2011   (DE) .................. 10 2011 080 667

(51) Int. Cl.
| F16K 11/07 | (2006.01) |
| F15B 13/04 | (2006.01) |
| F16H 61/30 | (2006.01) |

(52) U.S. Cl.
CPC ...... *F16K 11/0716* (2013.01); *F15B 13/0402* (2013.01); *F16K 11/07* (2013.01); *F16H 61/30* (2013.01)

(58) Field of Classification Search
CPC .. F16K 11/0716; F16K 11/07; F15B 13/0402; F16H 61/30
See application file for complete search history.

(56) References Cited

U.S. PATENT DOCUMENTS

| 2003/0221731 A1 | 12/2003 | Ogura et al. |
| 2004/0000347 A1 | 1/2004 | Shin et al. |
| 2007/0023722 A1 | 2/2007 | Oishi |
| 2009/0020718 A1 | 1/2009 | Stallmann |

(Continued)

FOREIGN PATENT DOCUMENTS

| CH | 1184910 | 6/1998 |
| DE | 32 26 809 | 1/1984 |
| DE | 42 24 469 | 1/1994 |

(Continued)

*Primary Examiner* — Kevin Murphy
*Assistant Examiner* — Patrick Williams
(74) *Attorney, Agent, or Firm* — Gerard Messina

(57) ABSTRACT

A slide valve having a valve slide which can be acted on by an actuator in a first direction, and by an impingement device in a second direction which is opposite the first direction, and which may hydraulically connect a first working connection to an inlet connection or to an outlet connection, and a second working connection to the inlet connection or to the outlet connection, with the aid of control sections. A control section associated with the first working connection has a diameter stage and/or an axially extending groove and/or an axially extending flattened portion, so that when the actuator does not act on the valve slide, the first working connection is hydraulically connected to the outlet connection with the aid of the diameter stage and/or the groove and/or the flattened portion.

18 Claims, 6 Drawing Sheets

(56) References Cited

U.S. PATENT DOCUMENTS

2011/0067771 A1* 3/2011 Navale ............... F16K 11/0708
                                                    137/625.25

FOREIGN PATENT DOCUMENTS

| DE | 43 19 162 | 12/1994 |
|----|-----------|---------|
| DE | 19938884 | 2/2001 |
| DE | 102008042624 | 4/2010 |

* cited by examiner

SLIDE VALVE HAVING A VALVE SLIDE

FIELD OF THE INVENTION

The present invention relates to a slide valve, and an automatic transmission.

BACKGROUND INFORMATION

Automatic transmissions of motor vehicles are known from the market in which one or multiple transmission clutches or actuating cylinders are used for actuating these clutches. In particular, double-acting hydraulic cylinders are used which have two hydraulic chambers which are separated by a piston and which may be actively moved in both directions of motion by an appropriate application of pressure.

Slide valves in a 4/3 configuration, for example, are used for switching the hydraulic volumetric flow required for actuating the hydraulic cylinder. Such slide valves often have a built-in compression spring ("valve spring") and an actuator which acts against the compression spring. The actuator is an electromagnet, for example. A particular force equilibrium between the actuator and the valve spring determines a corresponding axial position of a valve slide which is movable in the slide valve.

SUMMARY OF THE INVENTION

The object of the present invention is achieved by a slide valve according to the description herein, and by an automatic transmission according to the other independent patent claim. Advantageous refinements are stated in the subclaims. Features which are important for the present invention are also found in the following description and in the drawings, whereby the features may be important for the present invention alone as well as in various combinations without further explicit reference being made thereto.

The slide valve according to the present invention has the advantage that it may be operated with two working connections in such a way that when no energy is supplied to an actuator of the slide valve, both working connections are separated by a hydraulic inlet having a supply pressure, and connected to a hydraulic outlet. In particular, a valve slide which is axially movable in the slide valve does not need to have axial and/or radial boreholes, and/or no additional control sections are necessary. Energy may thus be saved and costs reduced, for example for the actuation of a double-acting hydraulic cylinder.

To control a piston of the double-acting hydraulic cylinder with the aid of the slide valve, in each case one of two hydraulic chambers is acted on by the supply pressure of a fluid (hydraulic fluid). At the same time, the respective other chamber is acted on by a comparatively low pressure ("vented") by being connected to a hydraulic outlet, for example. However, if the piston is not (or is no longer) moved, the supply pressure from the hydraulic cylinder may be switched off with the aid of the slide valve, and both chambers may be connected to the hydraulic outlet.

The slide valve according to the present invention has a valve slide which may be acted on by an actuator in a first direction, and by an impingement device in a second direction which is opposite the first direction. The impingement device may be an axially acting valve spring which is configured as a coil spring, for example. For controlling the double-acting hydraulic cylinder, the slide valve has a first and a second working connection, and may have an inlet connection and a first and a second outlet connection. The inlet connection and the outlet connections may be hydraulically connected to the particular working connection as a function of an axial position of the valve slide. For this purpose, the valve slide has appropriate control sections at its periphery. According to the present invention, it is provided that a control section associated with the first working connection has a diameter stage and/or an axially extending groove and/or an axially extending flattened area. The configuration is such that when the actuator does not act on the valve slide, the first working connection is hydraulically connected to the first outlet connection with the aid of the diameter stage and/or the groove and/or the flattened area. At the same time, the second working connection is hydraulically connected to the second outlet connection. The impingement device acts on the valve slide in the second direction, so that the valve slide may assume a defined position, which may be at one end of its axial play of movement. An axial length of the groove or of the flattened area may extend (comparable to the diameter stage) over only a portion of the axial length of the control section associated with the first working connection, in the direction of the first outlet connection. The diameter stage according to the present invention has the particular advantage that any temperature dependency of the viscosity of the hydraulic fluid has little or no adverse effect on the function of the slide valve.

Due to the "venting cross section," which is enlarged according to the present invention, between the first working connection and the first outlet connection, in a de-energized state of the actuator an undesirable pressure buildup which results via the leakage from inlet connection P to first working connection A is essentially prevented. On the one hand, the described venting cross section should not be too small, so that reliable venting is made possible. On the other hand, the venting cross section should not be too large, so that a pressure buildup which is required at the working connection for actuating the double-acting hydraulic cylinder is reliably and rapidly made possible.

The slide valve is particularly well suited for controlling the double-acting hydraulic cylinder when the slide valve is configured as a 4/4-way valve. Such a 4/4-way valve has four connections and four switch positions.

A so-called "zero cutoff" in which the inlet connection is blocked occurs in a de-energized state of the actuator.

In addition, it is provided that a play in diameter between the valve slide and an axial borehole guiding the valve slide is dimensioned in an area of the diameter stage according to the following formula:

$$S2 = x \cdot S1 \cdot \sqrt[3]{\frac{I2}{I1}},$$

where S2 is the play in diameter, x is a variable which characterizes a hydraulic pressure of the first working connection, S1 is a play in diameter between the valve slide and the axial borehole guiding the valve slide in a sealing area, I1 is an axial overlap of a control section in an area of the inlet connection, and I2 is an axial overlap of the diameter stage in an area of the first working connection. The term "x" is a factor for the hydraulic pressure which results at the first working connection due to leakage. A play in diameter S2 is thus described which in particular is optimized on the one hand with regard to a flow cross section which is achievable between the first working connection and the first outlet connection, and on the other hand with regard to the possible leakage.

The slide valve is further improved according to the described formula for S2 when variable x has a value in a range of x=4 to x=12, and which may be x=7.

When the control section associated with the first working connection has the axially extending groove or the axially extending flattened area as an alternative to the diameter stage, particularly favorable conditions result during operation of the slide valve when a cross-sectional area of the groove or of the flattened area is dimensioned according to the following formula:

$$QF = x \cdot S1 \cdot D2,$$

where QF is the cross-sectional area, x is the variable which characterizes the hydraulic pressure of the first working connection, S1 is the play in diameter between the valve slide and the axial borehole guiding the valve slide in a sealing area, and D2 is a diameter of the valve slide at a control section.

The slide valve is further improved according to the described formula for QF when variable x has a value in a range of x=2 to x=8, and which may be x=4.

One particularly suitable application of the slide valve according to the present invention is the control of a double-acting hydraulic cylinder in an automatic transmission of a motor vehicle. In particular, energy for controlling the actuator may be saved in phases in which the hydraulic cylinder does not carry out a working movement.

Exemplary specific embodiments of the present invention are explained below with reference to the drawings.

DETAILED DESCRIPTION

Figure 1:
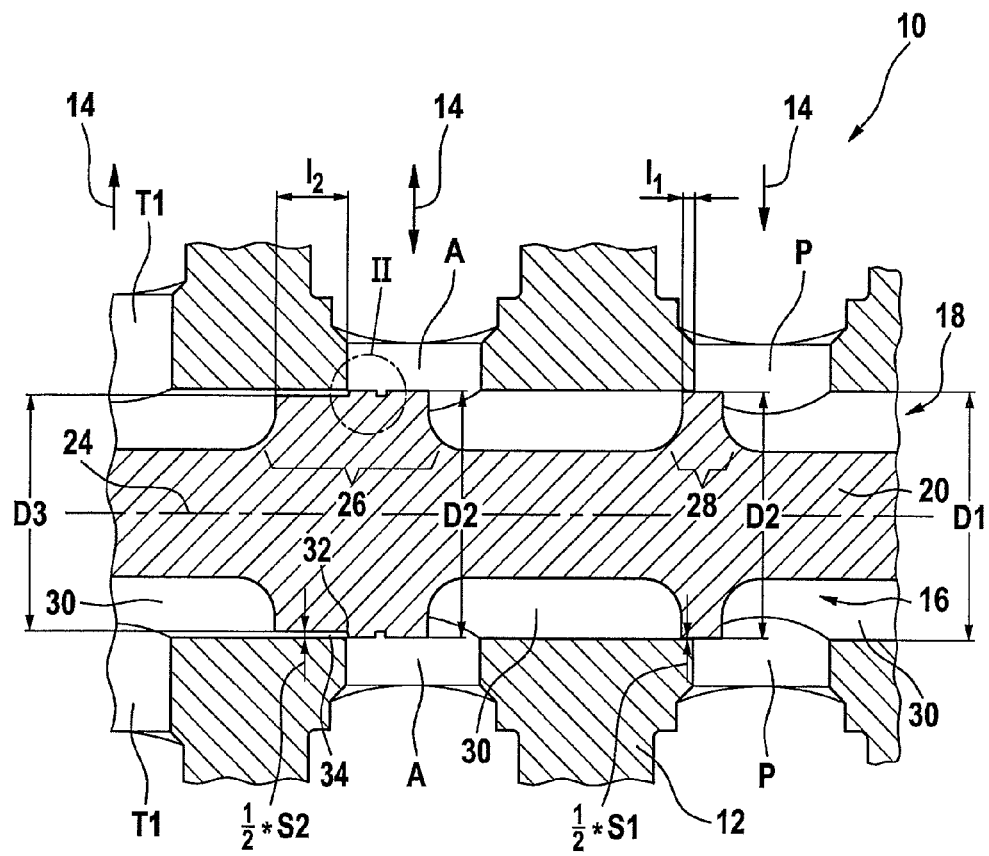
FIG. 1 shows a first sectional illustration of an axial section of a slide valve.

The same reference numerals are used for functionally equivalent elements and variables in all figures, also for different specific embodiments.

FIG. 1 shows an axial section of a slide valve 10 in a sectional illustration. Slide valve 10 includes a housing 12 which in the view in FIG. 1 has an inlet connection P, a first working connection A, and a first outlet connection T1, which in the present case are configured as radial boreholes in housing 12. Three arrows 14 depict the flow directions of a fluid 16 provided at the particular connections. Inlet connection P, first working connection A, and first outlet connection T1 open into an axial longitudinal borehole 18 in housing 12, in which a cylindrical valve slide 20 is situated in a sliding and guiding manner. In addition, housing 12 has circumferential radial sealing elements 22 (not illustrated in the drawing in FIG. 1; see FIG. 3). The cavities in slide valve 10 which are visible in the drawing are essentially filled with fluid 16 (hydraulic fluid). Slide valve 10 and valve slide 20 have a configuration which is at least partially rotationally symmetrical about a longitudinal axis 24.

In the view in FIG. 1, valve slide 20 has a first and second control section 26 and 28, respectively, as well as three axially extending circumferential radial recesses 30 situated next to control sections 26 and 28. First control section 26 is situated in the axial surroundings of working connection A, and has a maximum diameter D2. In its area at the left in the drawing and facing connection T1, first control section 26 has a diameter stage 32 in which diameter D2 merges into a smaller diameter D3. Axial longitudinal borehole 18 has a diameter D1 which is slightly larger than diameter D2.

Second control section 28 is situated in the axial surroundings of inlet connection P, and has a diameter D2. In the present case there is an axial overlap I1 between an edge of second control section 28 situated in the area of inlet connection P and a hydraulically corresponding section of housing 12. A play in diameter S1 is present in the area of axial overlap I1 according to a formula:

$$S1 = D1 - D2$$

In the present case there is an axial overlap I2 between the axial section of first control section 26 having diameter D3 and a hydraulically corresponding section of housing 12. An annular gap 34 is formed at axial overlap I2. A play in diameter S2 is present in the area of annular gap 34 according to a formula:

$$S2 = D1 - D3$$

Using the stated variables, a formula for play in diameter S2 may be formed:

$$S2 = x \cdot S1 \cdot \sqrt[3]{\frac{I2}{I1}},$$

where x is a variable for characterizing a hydraulic pressure which results at working connection A due to leakage. For example, variable x has a value from approximately 4 to approximately 12. In one particular specific embodiment, variable x has a value of 7.

Slide valve 10 in FIG. 1 is illustrated in the de-energized state of an actuator 50 (see FIG. 6) which acts on valve slide 20 ("zero cutoff"). The function of slide valve 10 is explained in greater detail in FIGS. 6 through 10 which follow.

Figure 2:
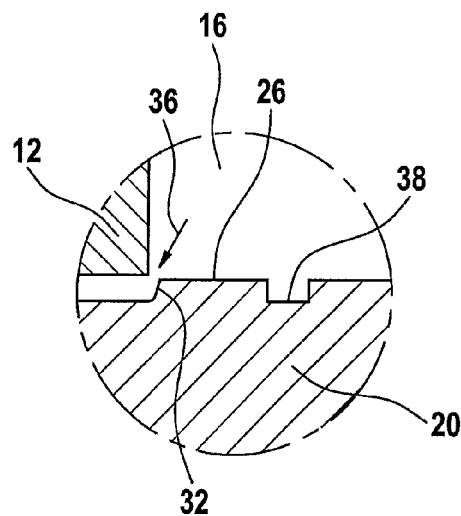
FIG. 2 shows an enlarged view of a circular detail II from FIG. 1.

FIG. 2 shows a circular detail from FIG. 1 in an enlarged view. A section of first control section 26 is illustrated in FIG. 2. It is apparent that a circumferential gap, indicated by an arrow 36, is formed in the area of diameter stage 32. In the present case, diameter stage 32 has an approximately ramp-shaped configuration, but may also have other shapes, for example in the form of a sharp edge or a curvature. In addition, first control section 26 has a circumferential radial groove 38 in the area of diameter D2.

Figure 3:
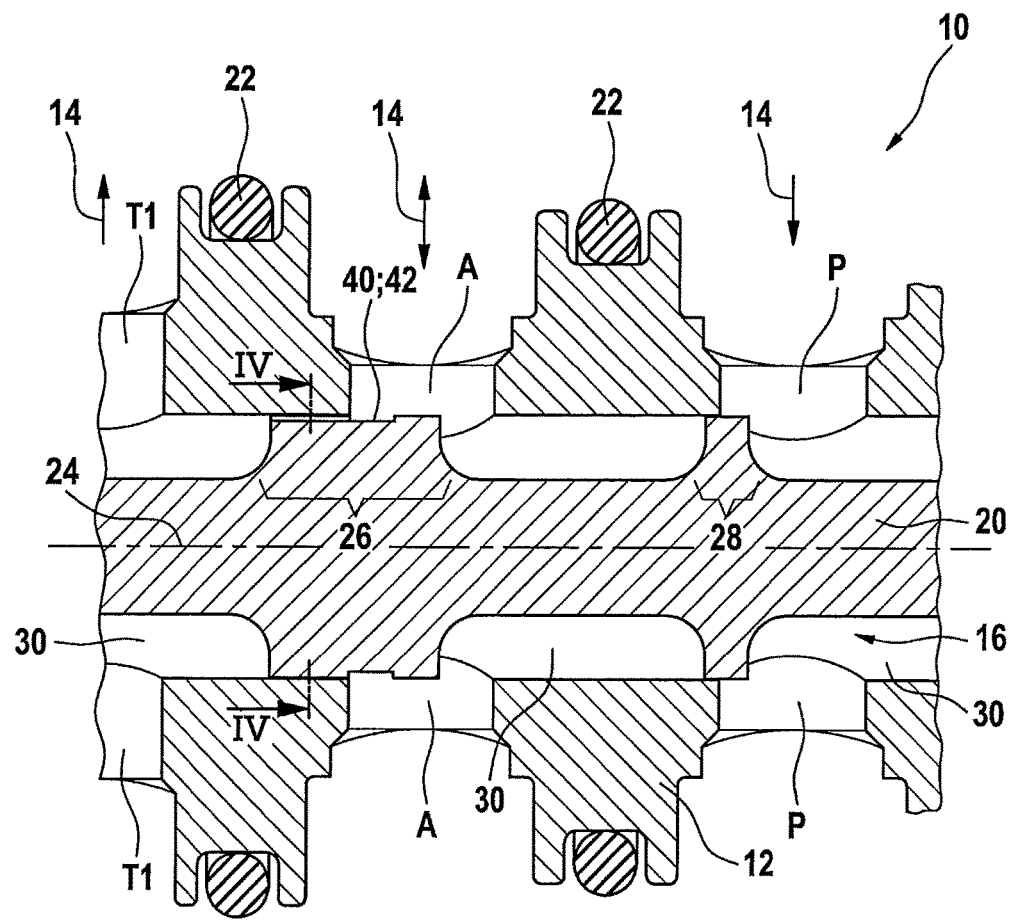
FIG. 3 shows a second sectional illustration of an axial section of the slide valve.

FIG. 3 shows one specific embodiment of slide valve 10 or of valve slide 20 as an alternative to FIG. 1. The axial position of valve slide 20 is comparable to FIG. 1. Circumferential radial sealing elements 22, not shown in FIG. 1 for reasons of clarity, are illustrated together with associated sections of housing 12 in FIG. 3. In FIG. 3, first control section 26 has an axially extending groove 40 or an axially extending flattened area 42 in the area of valve slide 20 at the top of the drawing.

Figures 4, 5:
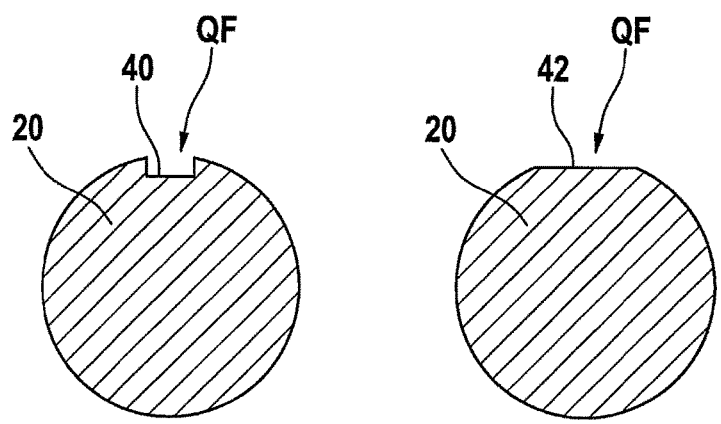
FIG. 4 shows a first sectional view along a line IV-IV in FIG. 3.
FIG. 5 shows a second sectional view along a line IV-IV in FIG. 3.

FIG. 4 shows a first alternative of valve slide 20 in a sectional view of FIG. 3 corresponding to a line IV-IV. Axially extending groove 40 is illustrated.

FIG. 5 shows a second alternative of valve slide 20 in a sectional view of FIG. 3 corresponding to line IV-IV. Axially extending flattened area 42 is illustrated.

In the specific embodiments of valve slide 20 according to FIGS. 4 and 5, a cross-sectional area QF of axially extending groove 40 or of axially extending flattened area 42 (i.e., the surface area of the material which is no longer present) may be dimensioned according to the following formula:

$$QF = x \cdot S1 \cdot D2,$$

where QF is the cross-sectional area, x is a variable which characterizes a hydraulic pressure of first working connection A, S1 is the play in diameter between valve slide 20 and axial borehole 18 guiding valve slide 20 in a sealing area, and D2 is the maximum diameter of valve slide 20 at control section 26. For example, variable x has a value of approximately 2 to approximately 8. In one particular specific embodiment, variable x has a value of 4.

Figure 6:
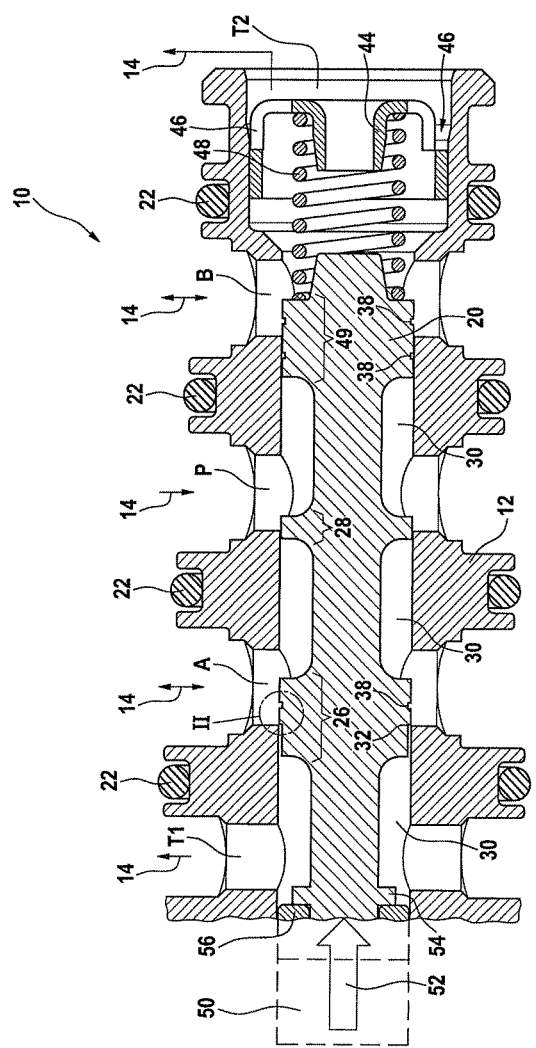
FIG. 6 shows a sectional view of the slide valve in a first position.

FIG. 6 shows a sectional view of slide valve 10 which is expanded with respect to FIGS. 1 and 3. A second working connection B in the right center area of the drawing as well as a second outlet connection T2 in the outer right area are also illustrated in FIG. 6. In addition, a cup-shaped housing element 44 is situated in an end section of axial longitudinal borehole 18 at the right in the drawing. Housing element 44 has recesses 46 through which fluid 16 may flow to second outlet connection T2. Furthermore, an axially acting impingement device in the form of a valve spring 48 is situated between an inner end face of housing element 44 and an end section of valve slide 20 at the right in the drawing. Valve slide 20 has a third control section 49 in the axial surroundings of second working connection B.

At an end section of valve slide 20 at the left in the drawing in FIG. 6, valve slide 20 may be acted on by a pressure force from an axially acting actuator 50. The direction of action of actuator 50 is denoted by an arrow 52. Actuator 50 is an electromagnet, for example, and is merely symbolically illustrated by a dotted-line box. Valve slide 20 has a stop ring 54 at an end section at the left in the drawing in FIG. 6, with the aid of which valve slide 20 strikes against a ring-shaped stop 56 fixed to the housing.

In FIG. 6, actuator 50 is de-energized and therefore exerts no force on valve slide 20. Valve spring 48 may thus press valve slide 20 against ring-shaped stop 56. Valve slide 20, the same as in FIG. 1, is thus in an end position at the left in the drawing. This results in the following behavior of slide valve 10:

According to FIG. 2, first working connection A is hydraulically connected to recess 30, and thus to first outlet connection T1, via a gap denoted by arrow 36, and via the portion of first control section 26 having diameter D3. Due to the "venting cross section," which is enlarged in this way, between first working connection A and first outlet connection T1, a pressure buildup at first working connection A resulting from leakage from inlet connection P to first working connection A is essentially prevented.

Inlet connection P is hydraulically separated from first working connection A with the aid of second control section 28.

Second working connection B is hydraulically separated from inlet connection P with the aid of third control section 49. At the same time, second working connection B is hydraulically connected to second outlet connection T2.

When first working connection A is connected to a first chamber, and second working connection B is connected to a second chamber, of a double-acting hydraulic cylinder (not illustrated), these two chambers are each hydraulically connected to first outlet connection T1 and second outlet connection T2, respectively, depending on the position of valve slide 20 at the moment, and are therefore essentially pressureless or have at least the same pressure. A piston of the double-acting hydraulic cylinder may thus remain in its instantaneous position. For example, the double-acting hydraulic cylinder is an element of a transmission control system of a motor vehicle automatic transmission, a gear being instantaneously engaged and maintained for a certain period.

Figure 7:
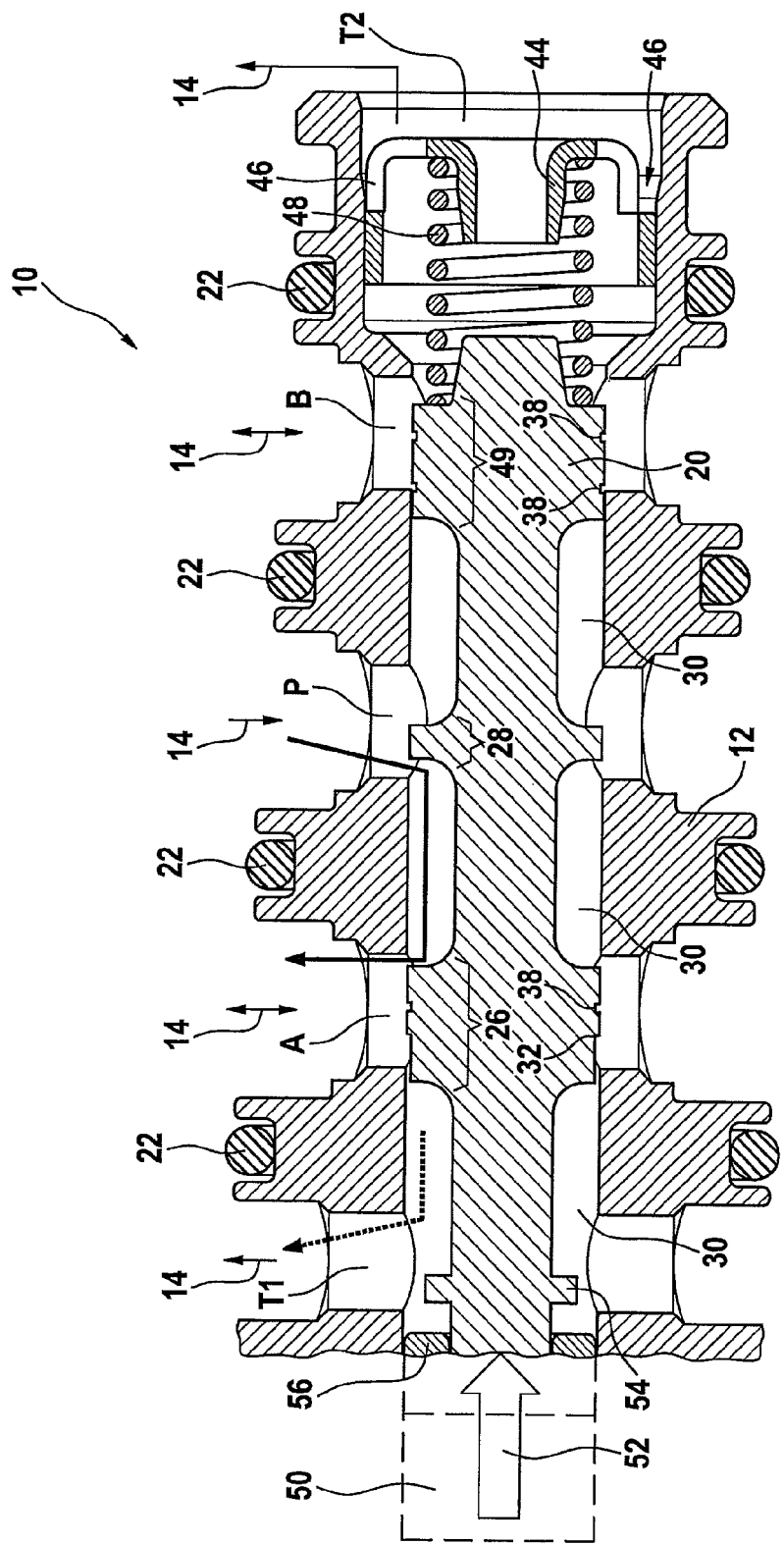
FIG. 7 shows a sectional view of the slide valve in a second position.

FIG. 7 shows slide valve 10 from FIG. 6 in a state in which actuator 50 is controlled with a first energy or a first current. With reference to FIG. 6, valve slide 20 in FIG. 7 is thus moved to the right in the drawing by a first degree (without a reference numeral).

This results in the following behavior of slide valve 10:

First outlet connection T1 is hydraulically connected to one of circumferential recesses 30 and may thus discharge fluid 16.

First working connection A is hydraulically connected to recess 30, and thus to first outlet connection T1, via the portion of first control section 26 having diameter D3. This is indicated by a dotted-line arrow in the drawing. Because play in diameter S2=D2−D3 is comparatively small, the discharge of fluid 16 from first working connection A to first outlet connection T1 is likewise comparatively small. However, axial overlap I2 is smaller with respect to FIG. 6.

Inlet connection P is hydraulically connected to first working connection A. This is indicated by an arrow in the drawing.

Second working connection B is hydraulically separated from inlet connection P with the aid of third control section 49. At the same time, second working connection B is hydraulically connected to second outlet connection T2.

Overall, a first working movement of the above-described double-acting hydraulic cylinder may thus be achieved, the chamber connected to first working connection A being filled with the working pressure prevailing at inlet connection P, and the chamber connected to second working connection B being emptied.

Figure 8:
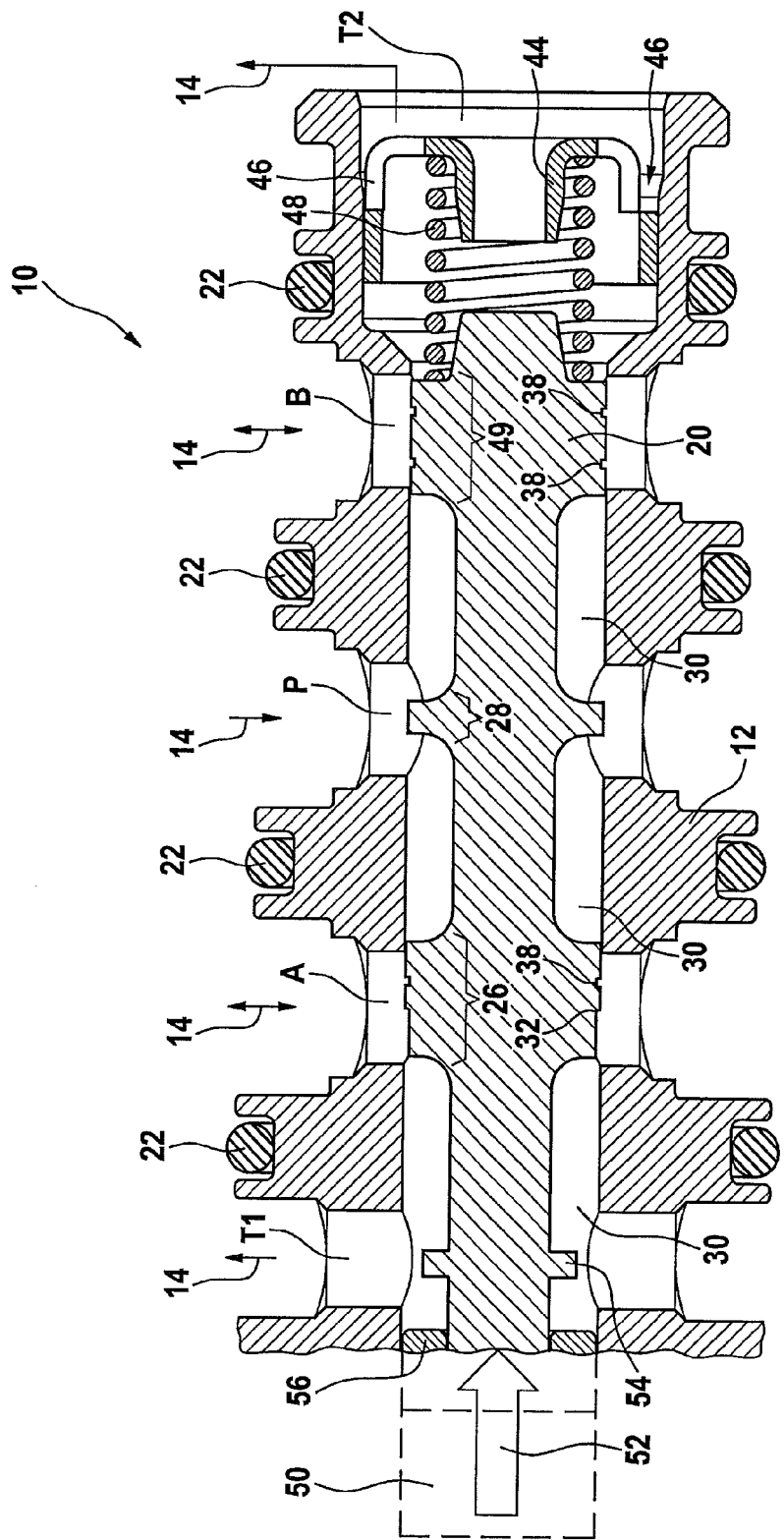
FIG. 8 shows a sectional view of the slide valve in a third position.

FIG. 8 shows slide valve 10 from FIG. 6 in a state in which actuator 50 is controlled with a second energy or a second current. With reference to FIG. 6, valve slide 20 in FIG. 8 is thus moved to the right in the drawing by a second degree (without a reference numeral), which is larger with respect to FIG. 7.

This results in the following behavior of slide valve 10:

First outlet connection T1 is hydraulically connected to one of circumferential recesses 30 and may thus discharge fluid 16.

First working connection A is hydraulically connected to recess 30, and thus to first outlet connection T1, via the portion of first control section 26 having diameter D3.

However, axial overlap I2 is slightly smaller with respect to FIG. 7, and is almost zero or slightly negative.

Inlet connection P is hydraulically separated from first working connection A and from second working connection B.

Second working connection B is hydraulically separated from inlet connection P with the aid of third control section 49. At the same time, second working connection B is hydraulically connected to second outlet connection T2.

Overall, this results in a "middle position" of slide valve 10 and a hydraulic action similar to FIG. 6.

Figure 9:
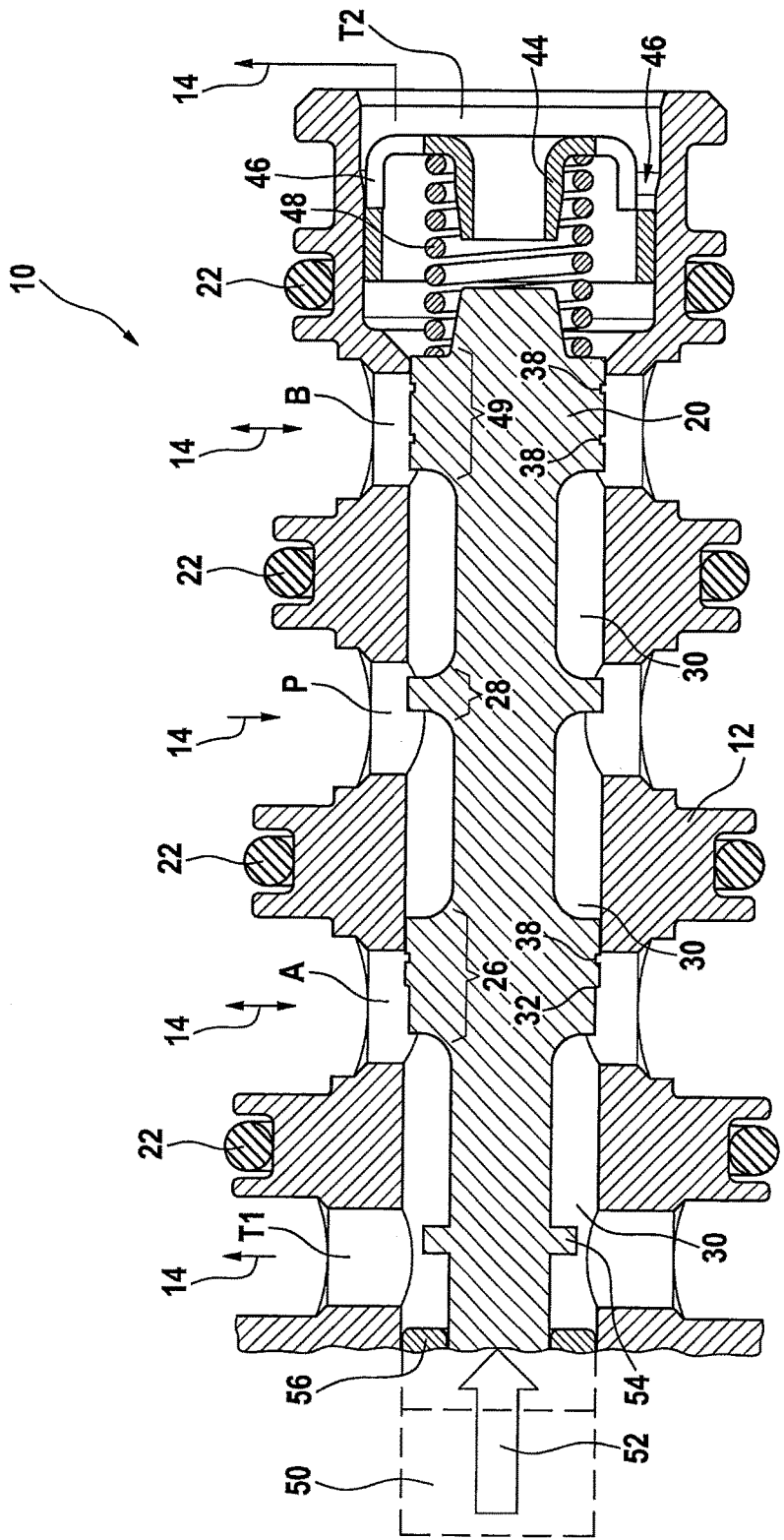
FIG. 9 shows a sectional view of the slide valve in a fourth position.

FIG. 9 shows slide valve 10 from FIG. 6 in a state in which actuator 50 is controlled with a third energy or a third current. With respect to FIG. 6, valve slide 20 in FIG. 9 is thus moved to the right in the drawing by a third degree (without a reference numeral), which is larger with respect to FIG. 8.

This results in the following behavior of slide valve 10:

First outlet connection T1 is hydraulically connected to one of circumferential recesses 30 and may thus discharge fluid 16.

First working connection A is hydraulically connected to first outlet connection T1.

Inlet connection P is hydraulically separated from first working connection A.

Second working connection B is hydraulically connected to inlet connection P and is hydraulically separated from second outlet connection T2.

Overall, a second working movement of the above-described double-acting hydraulic cylinder may thus be achieved, the chamber connected to first working connection A being emptied, and the chamber connected to second working connection B being filled with the working pressure prevailing at inlet connection P.

It is understood that the configuration and/or the sequence and/or the number of working connections A and B, of inlet connection P or inlet connections P, and of an outlet connection T or outlet connections T1 and T2 may possibly deviate from the specific embodiment in FIGS. 1 through 9. For example, it is conceivable to provide an outlet connection T in the middle in the drawing, and inlet connections P1 and P2 at the left and at the right, respectively, in the drawing. However, this is not shown in FIGS. 1 through 9.

What is claimed is:

1. A slide valve, comprising:
control sections; and
a valve slide which can be acted on by an actuator in a first direction, and by an impingement device in a second direction which is opposite the first direction, and which can hydraulically connect a first working connection to an inlet connection or to an outlet connection, and a second working connection to the inlet connection or to the outlet connection, with the aid of the control sections;
wherein a control section associated with the first working connection has at least one of a diameter stage, an axially extending groove, and an axially extending flattened portion, so that when the actuator does not act on the valve slide, the first working connection is hydraulically connected to the outlet connection with the aid of the at least one of the diameter stage, the groove, and the flattened portion, and the inlet connection is hydraulically separated from the first working connection and from the second working connection with the aid of the control sections,
wherein at least one of the following is satisfied:
(i) a play in a diameter between the valve slide and an axial borehole guiding the valve slide in an area of the diameter stage is dimensioned based upon a product of a variable which characterizes a hydraulic pressure of the first working connection and a play in diameter between the valve slide and the axial borehole guiding the valve slide in a sealing area and a root of the ratio of an axial overlap of the diameter stage in an area of the first working connection, and
(ii) a cross-sectional area of the groove or of the flattened area is dimensioned based on a product of the variable which characterizes the hydraulic pressure of the first working connection, a play in diameter between the valve slide and an axial borehole guiding the valve slide in a sealing area, and a diameter of the valve slide at a control section, and
wherein a play in a diameter between the valve slide and an axial borehole guiding the valve slide is dimensioned in an area of the diameter stage based upon the difference between the play in diameter and the product of the variable which characterizes the hydraulic pressure of the first working connection and the play in diameter between the valve slide and the axial borehole guiding the valve slide in a sealing area, and the product of the ratio of the axial overlap of a control section in an area of the inlet connection to an axial overlap of the diameter stage in an area of the first working connection.

2. The slide valve of claim 1, wherein the slide valve includes a 4/4-way valve.

3. A slide valve, comprising:
control sections; and
a valve slide which can be acted on by an actuator in a first direction, and by an impingement device in a second direction which is opposite the first direction, and which can hydraulically connect a first working connection to an inlet connection or to an outlet connection, and a second working connection to the inlet connection or to the outlet connection, with the aid of the control sections;
wherein a control section associated with the first working connection has at least one of a diameter stage, an axially extending groove, and an axially extending flattened portion, so that when the actuator does not act on the valve slide, the first working connection is hydraulically connected to the outlet connection with the aid of the at least one of the diameter stage, the groove, and the flattened portion, and
wherein a play in a diameter between the valve slide and an axial borehole guiding the valve slide is dimensioned in an area of the diameter stage according to the following formula:

$$S2 = x \cdot S1 \cdot \sqrt[3]{\frac{I2}{I1}},$$

where S2 is the play in diameter, x is a variable which characterizes a hydraulic pressure of the first working connection, S1 is a play in diameter between the valve slide and the axial borehole guiding the valve slide in a sealing area, I1 is an axial overlap of a control section in an area of the inlet connection, and I2 is an axial overlap of the diameter stage in an area of the first working connection.

4. The slide valve of claim 3, wherein the variable x has a value in a range of x=4 to x=12.

5. A slide valve, comprising:
control sections; and
a valve slide which can be acted on by an actuator in a first direction, and by an impingement device in a second direction which is opposite the first direction, and which can hydraulically connect a first working connection to an inlet connection or to an outlet connection, and a second working connection to the inlet connection or to the outlet connection, with the aid of the control sections;
wherein a control section associated with the first working connection has at least one of a diameter stage, an axially extending groove, and an axially extending flattened portion, so that when the actuator does not act on the valve slide, the first working connection is hydraulically connected to the outlet connection with the aid of the at least one of the diameter stage, the groove, and the flattened portion, and
wherein a cross-sectional area of the groove or of the flattened area is dimensioned according to the following formula: QF=x·S1·D2, where QF is the cross-sectional area, x is a variable which characterizes the hydraulic pressure of the first working connection, S1 is a play in diameter between the valve slide and an axial borehole guiding the valve slide in a sealing area, and D2 is a diameter of the valve slide at a control section.

6. The slide valve of claim 5, wherein the variable x has a value in a range of x=2 to x=8.

7. An automatic transmission for a motor vehicle which is actuatable by at least one double-acting hydraulic cylinder, comprising:
a slide valve, including:
control sections; and
a valve slide which can be acted on by an actuator in a first direction, and by an impingement device in a second direction which is opposite the first direction, and which can hydraulically connect a first working connection to an inlet connection or to an outlet connection, and a second working connection to the inlet connection or to the outlet connection, with the aid of the control sections;
wherein a control section associated with the first working connection has at least one of a diameter stage, an axially extending groove, and an axially extending flattened portion, so that when the actuator does not act on the valve slide, the first working connection is hydraulically connected to the outlet connection with the aid of the at least one of the diameter stage, the groove, and the flattened portion, and the inlet connection is hydraulically separated from the first working connection and from the second working connection with the aid of the control sections,
wherein at least one of the following is satisfied:
(i) a play in a diameter between the valve slide and an axial borehole guiding the valve slide in an area of the diameter stage is dimensioned based upon a product of a variable which characterizes a hydraulic pressure of the first working connection and a play in diameter between the valve slide and the axial borehole guiding the valve slide in a sealing area and a root of the ratio of an axial overlap of the diameter stage in an area of the first working connection, and
(ii) a cross-sectional area of the groove or of the flattened area is dimensioned based on a product of the variable which characterizes the hydraulic pressure of the first working connection, a play in diameter between the valve slide and an axial borehole guiding the valve slide in a sealing area, and a diameter of the valve slide at a control section, and
wherein a play in a diameter between the valve slide and an axial borehole guiding the valve slide is dimensioned in an area of the diameter stage based upon the difference between the play in diameter and the product of the variable which characterizes the hydraulic pressure of the first working connection and the play in diameter between the valve slide and the axial borehole guiding the valve slide in a sealing area, and the product of the ratio of the axial overlap of a control section in an area of the inlet connection to an axial overlap of the diameter stage in an area of the first working connection.

8. The slide valve of claim 3, wherein the variable x has a value in a range of x=4 to x=7.

9. The slide valve of claim 5, wherein the variable x has a value in a range of x=2 to x=4.

10. The automatic transmission of claim 7, wherein the slide valve includes a 4/4-way valve.

11. An automatic transmission for a motor vehicle which is actuatable by at least one double-acting hydraulic cylinder, comprising:
a slide valve, including:
control sections; and
a valve slide which can be acted on by an actuator in a first direction, and by an impingement device in a second direction which is opposite the first direction, and which can hydraulically connect a first working connection to an inlet connection or to an outlet connection, and a second working connection to the inlet connection or to the outlet connection, with the aid of the control sections;
wherein a control section associated with the first working connection has at least one of a diameter stage, an axially extending groove, and an axially extending flattened portion, so that when the actuator does not act on the valve slide, the first working connection is hydraulically connected to the outlet connection with the aid of the at least one of the diameter stage, the groove, and the flattened portion, and the inlet connection is hydraulically separated from the first working connection and from the second working connection with the aid of the control sections, and
wherein the play in a diameter between the valve slide and an axial borehole guiding the valve slide is dimensioned in the area of the diameter stage according to the following formula:

$$S2 = x \cdot S1 \cdot \sqrt[3]{\frac{l2}{l1}},$$

where S2 is the play in diameter, x is a variable which characterizes the hydraulic pressure of the first working connection, S1 is the play in diameter between the valve slide and the axial borehole guiding the valve slide in a sealing area, l1 is the axial overlap of a control section in the area of the inlet connection, and l2 is the axial overlap of the diameter stage in an area of the first working connection.

12. An automatic transmission for a motor vehicle which is actuatable by at least one double-acting hydraulic cylinder, comprising:

a slide valve, including:
  control sections; and
  a valve slide which can be acted on by an actuator in a first direction, and by an impingement device in a second direction which is opposite the first direction, and which can hydraulically connect a first working connection to an inlet connection or to an outlet connection, and a second working connection to the inlet connection or to the outlet connection, with the aid of the control sections;
wherein a control section associated with the first working connection has at least one of a diameter stage, an axially extending groove, and an axially extending flattened portion, so that when the actuator does not act on the valve slide, the first working connection is hydraulically connected to the outlet connection with the aid of the at least one of the diameter stage, the groove, and the flattened portion, and the inlet connection is hydraulically separated from the first working connection and from the second working connection with the aid of the control sections, and
wherein the cross-sectional area of the groove or of the flattened area is dimensioned according to the following formula: $QF = x \cdot S1 \cdot D2$, where QF is the cross-sectional area, x is a variable which characterizes the hydraulic pressure of the first working connection, S1 is the play in diameter between the valve slide and an axial borehole guiding the valve slide in a sealing area, and D2 is the diameter of the valve slide at a control section.

13. The automatic transmission of claim 12, wherein the variable x has a value in a range of x=4 to x=12.

14. The automatic transmission of claim 12, wherein the variable x has a value in a range of x=4 to x=7.

15. The automatic transmission of claim 12, wherein the variable x has a value in a range of x=2 to x=4.

16. The automatic transmission of claim 12, wherein the variable x has a value in a range of x=2 to x=8.

17. The slide valve of claim 1, wherein a cross-sectional area of the groove or of the flattened area is dimensioned based on a product of a variable which characterizes the hydraulic pressure of the first working connection, the play in diameter between the valve slide and an axial borehole guiding the valve slide in a sealing area, and the diameter of the valve slide at a control section.

18. The slide valve of claim 7, wherein a cross-sectional area of the groove or of the flattened area is dimensioned based on a product of a variable which characterizes the hydraulic pressure of the first working connection, the play in diameter between the valve slide and an axial borehole guiding the valve slide in a sealing area, and the diameter of the valve slide at a control section.

* * * * *